Figure 1:
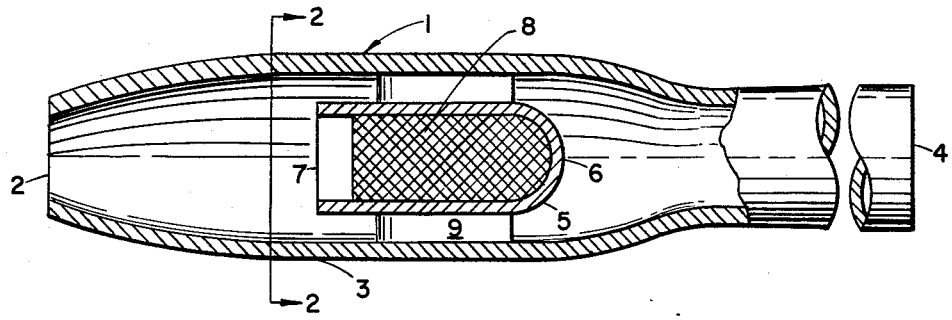

April 19, 1960        F. ZWICKY        2,932,943
JET PROPULSION DEVICE FOR OPERATION THROUGH A FLUID MEDIUM Filed Dec. 19, 1950        4 Sheets-Sheet 1

INVENTOR.
FRITZ ZWICKY
BY
D. Gordon Angus
ATTORNEY

April 19, 1960 F. ZWICKY 2,932,943
JET PROPULSION DEVICE FOR OPERATION THROUGH A FLUID MEDIUM
Filed Dec. 19, 1950 4 Sheets-Sheet 2

INVENTOR.
FRITZ ZWICKY
BY
D. Gordon Angus
ATTORNEY

April 19, 1960 F. ZWICKY 2,932,943
JET PROPULSION DEVICE FOR OPERATION THROUGH A FLUID MEDIUM
Filed Dec. 19, 1950 4 Sheets-Sheet 3
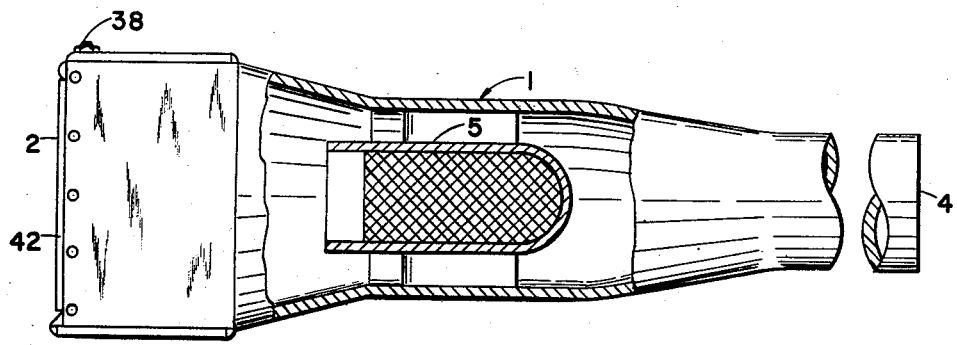
*Fig. 9*
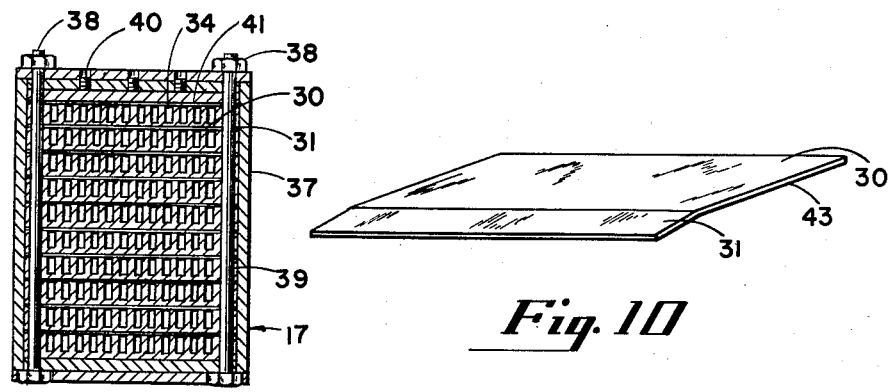
*Fig. 10*
*Fig. 13*
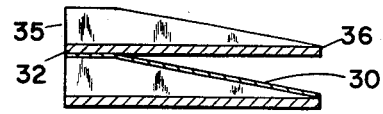
*Fig. 12*
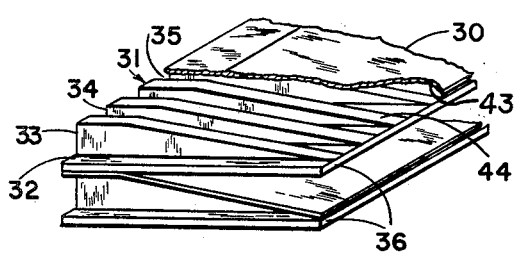
*Fig. 11*
INVENTOR.
FRITZ ZWICKY
BY
D. Gordon Angus
ATTORNEY INVENTOR.
FRITZ ZWICKY
BY
D. Gordon Angus
ATTORNEY

United States Patent Office 2,932,943
Patented Apr. 19, 1960

2,932,943

JET PROPULSION DEVICE FOR OPERATION THROUGH A FLUID MEDIUM

Fritz Zwicky, Pasadena, Calif., assignor, by mesne assignments, to Aerojet-General Corporation, Cincinnati, Ohio, a corporation of Ohio Application December 19, 1950, Serial No. 201,599

14 Claims. (Cl. 60—35.5)

This invention relates to jet propulsion units of the type adapted to be propelled through a fluid medium, particularly water, and has for its principal object to provide a device of this character which is operable as a "hydroresonator"; that is, with reaction pulses which establish their own frequency.

This is a continuation-in-part of my copending application Serial No. 95,493, filed May 26, 1949, entitled "Jet Propulsion Device for Operation Through a Fluid Medium."

Jet propulsion through a fluid medium such as air or water is well known. Such devices ordinarily comprise a duct having an inlet opening at the front through which the fluid from the medium is introduced. It is a common practice to react the fluid, or at least a part of it, with a propellant substance present in, or introduced into the duct. The reaction, or combustion, produces volumes of gases which force the excess fluid together with the reaction products out through the exhaust opening in the readward direction at high velocity, thereby generating the propulsive force.

Often such devices operate with intermittent explosions or firing, each firing or explosion serving to eject the products out through the rear to produce the reaction. In previous devices, the rate of frequency of the firing and reaction pulses is established, for example, by a suitable timing means for timing the firing or the rate of injections of the propellants.

In the operation of my present invention, the cycling, or frequency of the pulses is automatic, and the device assumes its own frequency in dependence on the physical proportions of the device. One or more reaction chambers are placed within the duct, and provided with a fuel or substance which is reactive with the water. The reaction chamber or chambers are provided with an open end through which the water comes into contact with the fuel to create the reaction. When a mass of water contacts the fuel in the chamber, the gas of reaction is formed which expands under its pressure to drive the water and reaction products out the exhaust end of the duct.

According to an embodiment of the invention, the combustion chamber is placed within the duct, with its open end toward the inlet opening, so that the incoming water enters the combustion chamber. The position of the combustion chamber may be reversed, if desired, so that the open end of the chamber is directed downstream.

According to another feature, an automatically operable valve may be placed across the duct between the combustion chamber and the inlet opening to close and open automatically in accordance with charges of pressure. Such valve or barrier is optional, however.

According to another feature, the reactive fuel may be supplied to the reaction chamber by a continuous injection.

Figure 2:
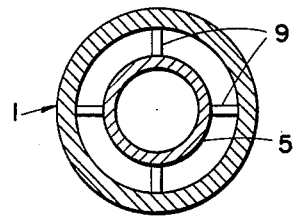
Figure 3:
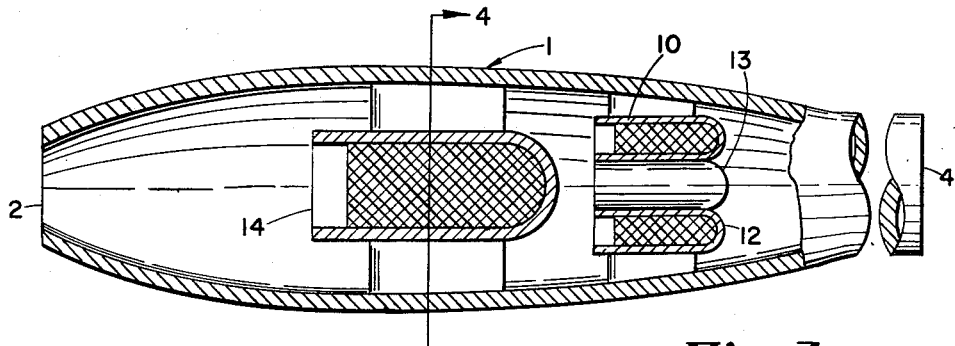
Figure 4:
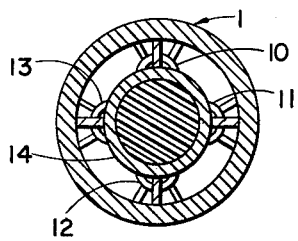
Figure 5:
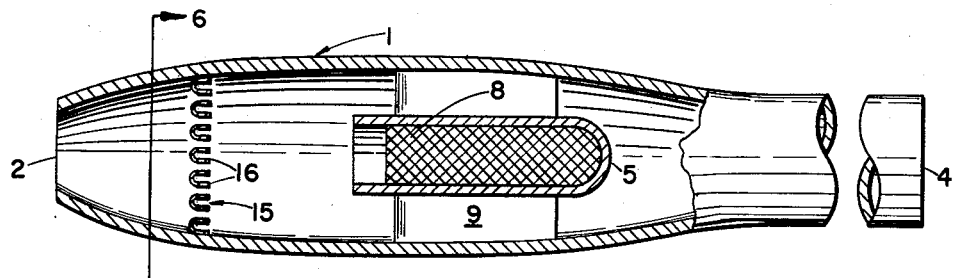
Figure 5A:
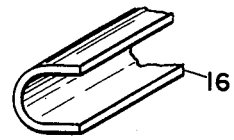
Figure 6:
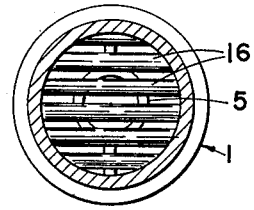
Figure 7:
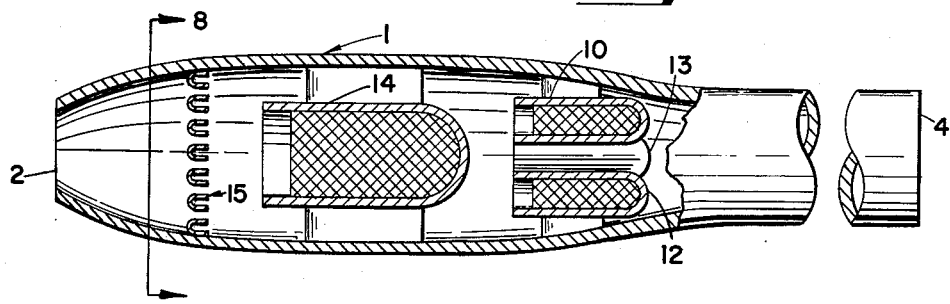
Figure 8:
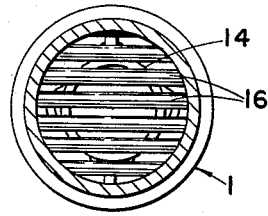
Figure 14:
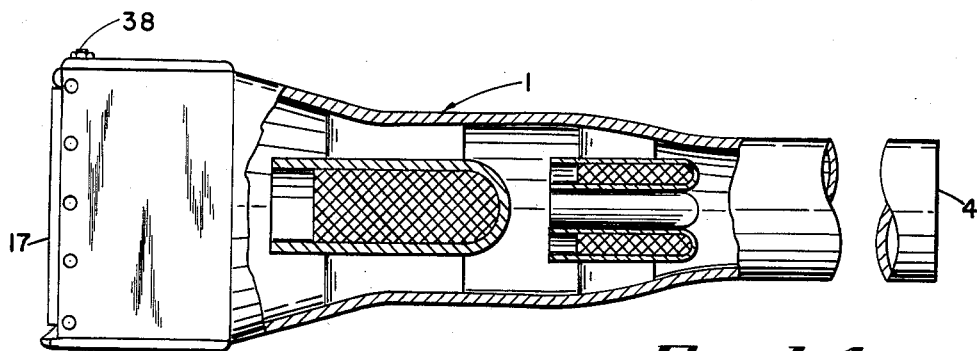
Figure 15:
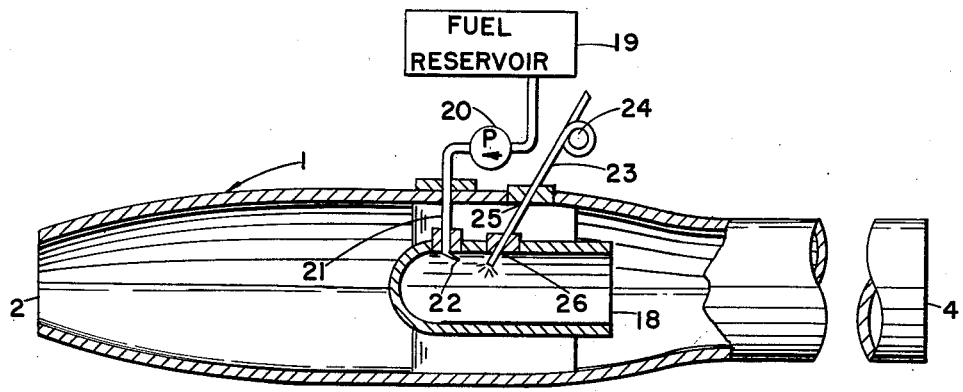
Figure 16:
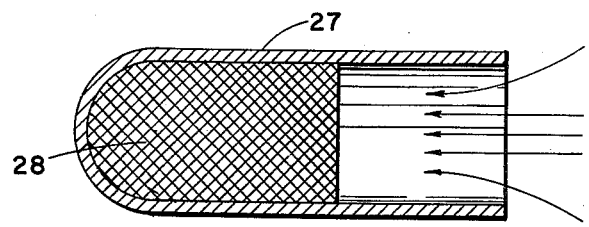

The foregoing and other features of my invention, will be better understood from the following detailed description and accompanying drawings of which:

Fig. 1 is a longitudinal view partially in cross-section showing a device according to my invention;
Fig. 2 is an end view of the device shown in Fig. 1;
Fig. 3 is a longitudinal view partially in cross-section showing another modification of my invention;
Fig. 4 is an end view of the device of Fig. 3;
Fig. 5 is another side view partially in cross-section showing another embodiment of my invention;
Fig. 5a shows a detail of a flow barrier used in the arrangement of Fig. 5;
Fig. 6 shows an end view of the device of Fig. 5;
Fig. 7 is a side view showing partially in cross-section another embodiment of my invention;
Fig. 8 is an end view of the arrangement of Fig. 7;
Fig. 9 is a side view partially in cross-section showing another embodiment of my invention;
Fig. 10 shows an element of a blade used in a valve assembly used in some of the embodiments of the invention;
Fig. 11 illustrates an assembly of blades according to Fig. 10 with other elements of the valves;
Fig. 12 is a cross-section view showing the valve assembly;
Fig. 13 shows a front view of the assembled valve;
Fig. 14 shows a side view partially in cross-section of another embodiment of the invention;
Fig. 15 shows a longitudinal view partially in cross-section of another embodiment of the invention; and
Fig. 16 illustrates a combustion chamber containing propellant material, which may be substituted for the combustion chamber shown in Fig. 15.

Referring to Fig. 1, there is illustrated a propulsion unit in accordance with my invention, which is adapted for propulsion of a projectile or craft through water; and this unit may be attached to the projectile or craft in some convenient manner for the purpose. The propulsion unit comprises an outer shell 1 which is shown having a circular cross-section with an open mouth 2. In this embodiment, which has no inlet water valve to prevent expulsion of water forwardly due to firings of the fuel, it is preferable to form the duct with a region of expanding cross-section area for a distance back of the mouth. This will assist in the starting of the forward motion and in the continuance of forward motion at the slower speeds which do not build up a great pressure head at the inlet opening. Accordingly the cross-section of the duct expands rearwardly to a region 3, behind which the duct will taper to smaller cross-sections downstream from region 3 to form an elongated pipe-like portion commonly called a tail-pipe 4, the outlet from the tailpipe being open. There is centrally supported within the region 3 of the duct, a chamber 5, closed at the rear end 6 and open at the front end 7, the chamber being shown cylindrical in form with its longitudinal axis colinear with the longitudinal axis of the duct. Thus the chamber opening at 7 faces forwardly substantially in the direction of the longitudinal axis of the duct. The combustion chamber 5 is supported centrally within the duct by a number of webs or vanes 9 attaching to the duct and to the chamber and extending from the inner wall of the duct to the outer wall of the chamber at spaced intervals as indicated in Fig. 2. There is contained within this chamber 5 a fuel or propellant material 8; this is a mass of solid or semisolid material which I prefer to call a hydrofuel, to signify that it is reactive with the water entering the duct. Suitable hydrofuels which may be used for this purpose are the elements including the alkali metals Li, Na, K, Rb, Cs; metals such as Mg, Al, B, etc.; elements such as Si, etc.; alloys of the elements such as the lithium silicides; amalgams of the metals, elements, and alloys with mercury; and chemical compounds such as $LiBH_4$, $NaBH_4$, LiALH₄, NaALH₄, LiH, NaH, KH, CaH₂, and the like. In some cases substances which are not too reactive with water may be made water-reactive by the addition of suitable additives which may be, for example, other elements.

Figs. 3 and 4 show a modification of the arrangement shown in Figs. 1 and 2, a difference being that in Figs. 3 and 4 there are five fuel chambers instead of the single fuel chamber of Figs. 1 and 2. Four of these fuel chambers 10, 11, 12 and 13 are located at equal angular distances apart around the inside periphery of the duct; and the fifth chamber 14, which may, if desired, be a little larger than the other chambers, is mounted concentrically within the duct ahead of the other four chambers. All these chambers are supported inside the duct by suitable web or supporting members attaching them to the inner duct wall. All of the chambers are closed at their rear ends and are open at their forward ends, exposing the solid or semi-solid fuel held therewithin.

Figs. 5 and 6 show another modification of the invention which is similar to that shown in Figs. 1 and 2, except for the addition of a directional barrier 15 located across the cross-section of the duct between the inlet opening 2 and the chamber 5. The barrier 15 comprises a number of parallel arranged channel barriers 16 as indicated in the detail view, Fig. 5a. These are U-shaped channel barriers the ends of which are fastened within the periphery of the duct, and the rounded base of the U being directed toward the front end and the free ends of the U being directed toward the rear, there being provided a space between the sides of each parallel channel bar through which the water can flow in entering the duct. The function of such a barrier is to allow the water to flow more freely through the duct from front to back than from back to front so that the barrier tends to prevent back pressure from forcing water out of the front end of the duct.

The arrangement of Figs. 7 and 8 is similar to that of Figs. 3 and 4, except that a barrier 15, similar to that shown in Fig. 5, has been added across the inlet end of the duct.

Fig. 9 shows a further modification of the invention which is somewhat similar to that shown in Fig. 5. In Fig. 9 the barrier system 15 is replaced by a reed valve system 17; and since this valve operates to prevent water from being forced out of the duct through the inlet opening pursuant to the firings of the fuel, it is not so important to provide the forward region of the duct with a taper to provide the expanding cross-section structure of Fig. 1, it will be convenient in this embodiment to construct the inlet region as that of greatest cross-section. This will have the effect of facilitating the entry of water into the duct past the valve structure and reeds which tends to reduce the effective cross-section of water flow somewhat.

The construction of the valve assembly 17, which is located in the entrance to the duct, is described in detail with reference to Figs. 10, 11, 12 and 13. The valve is of the flutter or blade valve type, and is built up of an assembly of alternating flexible blades 30 and rigid channel members 31. Each channel member 31 comprises a rectangular plate 32 the upper surface of which is provided with a series of partition members 33, which are preferably integral with the plate 32 and run parallel to each other as shown. These partition members form a series of channels 34 preferably tapering in depth. They are deeper at the leading edge 35 and diminish as they approach the rear end 36 to coincide with the thickness of rear edge of blade 30.

In assembling the valve unit 17 several flexible blades 30 are alternatively interleaved between the several channel members 31 and are firmly held near their leading edge 35 by the channel plate 32 of one channel member and the upper edge of partitions 33 of the adjacent channel member.

These valves and rigid channel members are securely held together in a valve housing 37 by bolts 38 which pass through the holes 39 provided in both the flexible blades 30 and the rigid channel members 31 as shown in Fig. 13. The central span of the valve assembly is placed in compression by a series of compression bolts 40 which press against a bearing plate 41. Valve housing 37 is shown as rectangular for convenience only and may be of any other suitable shape.

When a series of these valves and channel members are formed in the housing to form a complete valve assembly 17 they completely fill the inlet space just preceding the firing chamber 5. For purpose of assembly the completed valve slides into the housing 37 and is clamped into position by bolts 38, compression bolts 40 and a pair of shoulder-shaped retainers 42 which are attached to the forward portion of the sides of duct opening 2.

Figs. 11 and 12 are views illustrating the means by which one of the valve blades is sandwiched between two of the channel members.

Fig. 11 shows a cutaway view looking into the channel member 31 showing its relationship to valve blade 30. The arrangement is such that the lower face 43 of each flexible blade is able to vibrate alternately contacting and moving away from the top edge 44 of partition 33. This creates the valve action placing the valve in a closed position whenever the pressure on the downstream side of the valve assembly exceeds the pressure acting from the upstream side and permitting flow of liquid through the valve when the pressure on the upstream side of the valve exceeds that of the downstream side pushing the blade away from the top of channel partition 33.

Fig. 14 is a modification of the invention somewhat similar to that of Fig. 7, but the barrier 15 of Fig. 7 is replaced by a read valve system 17 similar to that used in Fig. 9.

Fig. 15 shows a further modification of the invention, which differs from the foregoing modifications principally in that the combustion chamber 18 has its open end facing rearwardly instead of forwardly. Thus the chamber opening faces downstream substantially in the direction of the longitudinal axis of the duct. In this modification, no inlet water valve or barrier is used, so that the system operates as a valveless duct. It will be understood, of course, that if desired, a barrier such as the barrier 15 of Fig. 5, or an automatic reed valve such as valve 17 of Fig. 9 could be employed if desired.

In this modification, the fuel in the chamber 18 is not a solid or semi-solid mass placed in the chamber before using it, but instead, the fuel is injected into the chamber during use. For this purpose, there is provided a fuel reservoir 19 which will contain a suitable hydrofuel, ordinarily in liquid or semi-liquid form, or some other suitable form such as a colloidal suspension in a liquid, or a fluid gel, or the like. This is pumped into the chamber by a pump 20, sending it through conduit 21 and injecting it into the chamber through an injector nozzle 22. The hydrofuel thus injected may be for example molten magnesium, aluminum, lithium or aluminum borohydride. If desired, an auxiliary propellant may also be used; and this may be in the form of a fairly stiff rod or wire 23, which can easily be bent and straightened out. A shaft 24 driven at a uniform rate by some suitable source of power may be employed, and the rod 23 may be wrapped around it for several turns from a supply reel. Thus, the relatively slow turning of the shaft will draw wire from the supply reel, pass it around the shaft 24, and feed it down through a packed opening 25 in the side of the duct, and another opening 26 through the wall of the combustion chamber 18.

The rearwardly facing chamber need not have the particular kind of fuel feeding arrangement shown in Fig. 15. Instead, the chamber may be in the form of chamber 27, shown in Fig. 16, containing a solid or semi-solid propellant 28, such as is used in the modifications preceding Fig. 15. In this arrangement, water enters the opening in the chamber in the rear to strike the surface of the fuel 28, as indicated by the arrows in Fig. 16.

When being used, the devices according to my invention operate in a resonant pulsing manner, the frequency of the pulses finding their own natural period. This establishes them as so-called hydroresonators in distinction from other devices in which the firing periods are timed by a timing means.

Referring particularly to Fig. 1, water entering the duct enters the open end 7 of the firing chamber 5, striking the surface of the fuel 8, which, being spontaneously combustible or reactive with the water, immediately reacts, forming a gas bubble or the like, which expands out from the opening 7 and into duct at the stagnation region where it is increasing to a larger cross-section.

In a valveless duct of this character, the device will ordinarily be started by some external means which will move it forwardly through the water to create a pressure head at the inlet opening 2 against which the pressure of the expanding gas will act, thus causing the gas to expand rearwardly through the duct and to push ahead of it such water as lies in the duct. These products are forced out the tailpipe 4. As soon as the gas bubble has moved rearwardly down the duct more water comes in through the entrance opening and into the entrance 7 of the combustion chamber to produce another reaction or explosion. The rate at which these reaction pulses occur will depend on the physical dimensions and proportions of the duct. In other words, the duct will act as a resonator and the pulses will find their own natural frequency.

The arrangement of Fig. 3 operates quite similarly to that of Fig. 1, except that the pressure from the reaction of the hydrofuel in the forward chamber 14, will be augmented by reactions from the four rearward chambers 10 to 13, which will create reaction pulses of their own immediately following each reaction pulse of the forward chamber 14.

The operation of the ducts of Figs. 5 and 7 is similar to that of Figs. 1 and 3 respectively, except that in Figs. 5 and 7, the barriers 15 are present against which the expanding gas bubbles from the combustion chamber can act and thus help the gas to act in a rearward direction. Between each reaction or explosion water will enter between the channel members to flow on through the duct. Ducts provided with channel members such as shown in Figs. 5 and 7 can be started up from a position of rest or nearly rest because of the effective barrier action.

In the arrangements of Figs. 9 and 14, wherein the automatic reed valves are used at the water inlet, the duct is even more adapted to start up from a condition of rest, because at each reaction or combustion of the propellant, the pressure closes the reed valves to act as a pressure stop, so that the full force of the explosions act rearwardly. Thus, the action of the reed valves is to close and to open intermittently in correspondence with the rate of the explosions. During periods when they are open, water flows through them toward the rear of the duct.

The arrangement of Fig. 15 is quite similar in its pulsing operation to the valveless duct arrangement of Fig. 1. In both Fig. 15 and Fig. 16, the incoming water comes into the open end of the combustion chamber which faces rearward, and the force of the resulting explosions tends to act somewhat more in a rearward direction than in the case of Fig. 1.

I claim:

1. A hydroresonator jet propulsion device comprising a duct having an inlet opening at one end and an exhaust opening at the other end, a reaction chamber within the duct and arranged with space between the wall of the duct and the wall of the chamber so that water can flow past the chamber through said space, said reaction chamber having an opening leading into it, and containing a hydrofuel from the group consisting of solids and liquids spontaneously reactive with water and located at a level below the uppermost wall of the duct so that water from within the duct can reach the hydrofuel, whereby when the device is moving forwardly through water, water in the duct enters said chamber opening and reacts with the hydrofuel, producing gaseous products of reaction which expand out of the chamber into the duct and drive water out of the chamber and rearwardly out the exhaust opening, said entrance of water and reaction and expansion of gaseous products and driving of water occurring at a natural period of repetition.

2. Apparatus according to claim 1 in which the opening into the reaction chamber faces toward the mouth of the duct.

3. Apparatus according to claim 1 in which the opening into the reaction chamber faces toward the exhaust opening of the duct.

4. Apparatus according to claim 1 in which a directional barrier is located across the duct between the inlet opening and the reaction chamber, the direction of said barrier being such as to allow water to flow more freely downstream than upstream.

5. Apparatus according to claim 1 in which an automatic valve is placed across the duct between the inlet opening and the reaction chamber.

6. Apparatus according to claim 1 in which the reaction chamber is symmetrically located within the duct so that water flows past it around all sides of it.

7. A hydroresonator jet propulsion device comprising a duct having an inlet opening at one end and an exhaust opening at the other end, a plurality of reaction chambers within the duct and arranged with space between the wall of the duct and the wall of each chamber so that water can flow past the chambers through said space, said chambers being spaced apart from each other and each chamber having an opening leading into it, and containing a hydrofuel from the group consisting of solids and liquids spontaneously reactive with water and located at a level below the uppermost wall of the duct so that water from within the duct can reach the hydrofuel, whereby when the device is moving forwardly through water, water in the duct enters said chamber opening and reacts with the hydrofuel, producing gaseous products of reaction which expand out of the chamber into the duct and drive water out of the chamber and rearwardly out the exhaust opening, said entrance of water and reaction and expansion of gaseous products and driving of water occurring at a natural period of repetition.

8. A jet hydroresonator propulsion device comprising a duct having an inlet opening at one end and an exhaust opening at the other end, a reaction chamber within the duct and having an axis substantially parallel with the axis of the duct and arranged with space between the wall of the duct and the wall of the chamber so that water can flow past the chamber through said space, said combustion chamber having an opening leading into it, a fuel injector leading into the combustion chamber for injecting a hydrofuel therein, said hydrofuel being spontaneously reactive with water, whereby when the device is moving forwardly through the water, water in the duct enters said chamber opening and reacts with the hydrofuel, producing gaseous products of reaction which expand out of the chamber into the duct and drive water out of the chamber and rearwardly out the exhaust opening, said entrance of water and reaction and expansion of gaseous products and driving of water occurring at a natural period of repetition.

9. A hydroresonator jet propulsion device comprising a duct having an inlet opening at one end and an exhaust opening at the other end, a reaction chamber within the duct and arranged with space between the wall of the duct and the wall of the chamber so that water can flow past the chamber through said space, said reaction chamber having an opening leading into it, a solid hydrofuel within the chamber and located at a level below the uppermost wall of the duct and having an exposed surface accessible to the water from said opening, said hydrofuel being spontaneously reactive with water, whereby water in the duct enters said chamber opening and reacts with the hydrofuel at said surface, producing gaseous products of reaction which expand out of the chamber into the duct and drive water out of the chamber and rearwardly out the exhaust opening, said entrance of water and reaction and expansion of gaseous products and driving of water occurring at a natural period of repetition.

10. A hydroresonator jet propulsion device comprising a duct having an inlet opening at the front end and an exhaust opening at the rear end, a reaction chamber within the duct and arranged with space between the wall of the duct and the wall of the chamber so that water can flow past the chamber through said space, said reaction chamber having an opening leading into it and facing in the rearward direction, a liquid fuel injector leading into the reaction chamber for injecting a liquid hydrofuel therein, said hydrofuel being spontaneously reactive with water, whereby water in the duct enters said reaction chamber through the chamber opening and reacts with the hydrofuel, producing gaseous products of reaction which expand out of the chamber into the duct, and drive water out of the chamber and rearwardly out of the exhaust opening, said entrance of water and reaction and expansion of gaseous products and driving of water rearwardly occurring at a natural period of repetition.

11. A hydroresonator jet propulsion device comprising a duct having an inlet opening and an exhaust opening, a combustion chamber within the duct between said inlet and exhaust openings and having an axis substantially parallel with the axis of the duct and arranged with space substantially all around the chamber between the wall of the duct and the wall of the chamber so that water can flow past the chamber through said space, said combustion chamber having an opening providing communication between the duct and the interior of the chamber, said last-mentioned opening facing substantially in the direction of the longitudinal axis of the duct, and a hydrofuel maintained in said chamber at a level below the uppermost wall of the duct so that water from within the duct can reach the hydrofuel, whereby when the device is moving forwardly through water, some of the water in the duct enters said chamber through said chamber opening and reacts with said hydrofuel producing gaseous products of reaction which expand out of the chamber into the duct and drive water out of the chamber and rearwardly out the exhaust opening, said entrance of water and reaction and expansion of gaseous products and driving of water occurring at a natural period of repetition.

12. Apparatus according to claim 11 in which the chamber opening faces upstream.

13. Apparatus according to claim 11 in which the chamber opening faces downstream.

14. Apparatus according to claim 1 in which the hydrofuel is of a solid consistency.

References Cited in the file of this patent

UNITED STATES PATENTS

| | | |
|---|---|---|
| 368,678 | McDougall | Aug. 23, 1887 |
| 515,500 | Nobel | Feb. 27, 1894 |
| 1,517,422 | Hall | Dec. 2, 1924 |
| 1,612,794 | Bender | Jan. 4, 1927 |
| 2,375,180 | Vigo | May 1, 1945 |
| 2,377,247 | Lagelbauer | May 29, 1945 |
| 2,461,797 | Zwicky | Feb. 15, 1949 |
| 2,522,945 | Gongwer et al. | Sept. 19, 1950 |

FOREIGN PATENTS

| | | |
|---|---|---|
| 602,807 | Great Britain | June 3, 1948 |